Sept. 6, 1960   L. A. RICE   2,951,674
SHOCKPROOF MOUNTING
Filed Sept. 23, 1957

INVENTOR.
Lyman A. Rice
BY John T. Marvin
His Attorney

United States Patent Office 2,951,674
Patented Sept. 6, 1960

2,951,674

SHOCKPROOF MOUNTING

Lyman A. Rice, Anderson, Ind., assignor to General Motors Corporation, Detroit, Mich., a corporation of Delaware Filed Sept. 23, 1957, Ser. No. 685,563

3 Claims. (Cl. 248—358)

This invention relates to arrangements for connecting two members, and more particularly to a mounting grommet which will absorb vibrations and shocks and connect a mounting base to a support.

The grommet, according to the present invention, is particularly suited for use on modern assembly methods as it is readily installed in position between two parallel plates. The grommet further is particularly useful in connection with motor vehicles as it will present an attractive appearance and will securely fasten the parts to be secured together and will insulate the mounted part from shock and vibration. The mounting grommet shown in the drawings is particularly suited for mounting electrical equipment in a motor vehicle and may be used to secure a voltage and current regulator for the battery charging system of the vehicle to a support. Heretofore these regulator units are usually mounted by means of bolts, screws and the like, in various locations such as the fire wall of the vehicle. When these metallic fasteners are used, the threaded portions thereof always project from the opposite side of the mounting wall. These threaded portions not only present an unsightly appearance, but may cause injury to the persons repairing or servicing the vehicle.

It is, therefore, an object of the present invention to provide a mounting arrangement for electrical units such as voltage regulators which will be neat in appearance, provide a secure mount for the regulator, be readily installable and will insulate the regulator from shock and vibrations and thereby improve the operation of the regulator.

It is a further object of the present invention to provide a mounting grommet with a groove that has a varying axial dimension and which will normally maintain a plate in a neutral position and will oppose movement of the plate from the neutral position by providing a resistance against movement that is proportional to the distance moved from the neutral position.

Another object of the present invention is to provide a mounting grommet with a projectile-like shape to have a rounded end and a part receiving groove adjacent the rounded end to facilitate the installation of the grommet in an aperture in a metal plate and to provide a member that is insertable into the grommet with an enlarged end that is receivable in the rounded end to force the material of the grommet adjacent the groove into tight engagement with the plate.

A further object of the present invention is to provide a mounting grommet with a projectile-like shape that has two spaced grooves therein which circumscribe the grommet body and wherein one of the grooves is disposed adjacent the rounded end of the body and the other groove has a substantially triangular cross section and is disposed adjacent the flat end of the body so that a member which is insertable in a bore in the body will reinforce the material of the body adjacent both of the grooves.

Further objects and advantages of the present invention will be apparent from the following description, reference being had to the accompanying drawings wherein a preferred embodiment of the present invention is clearly shown.

In the drawings:

Figure 1 in perspective shows a plurality of the mounting grommets according to the present invention as securing a voltage and current regulator to a support plate.

Figure 1:
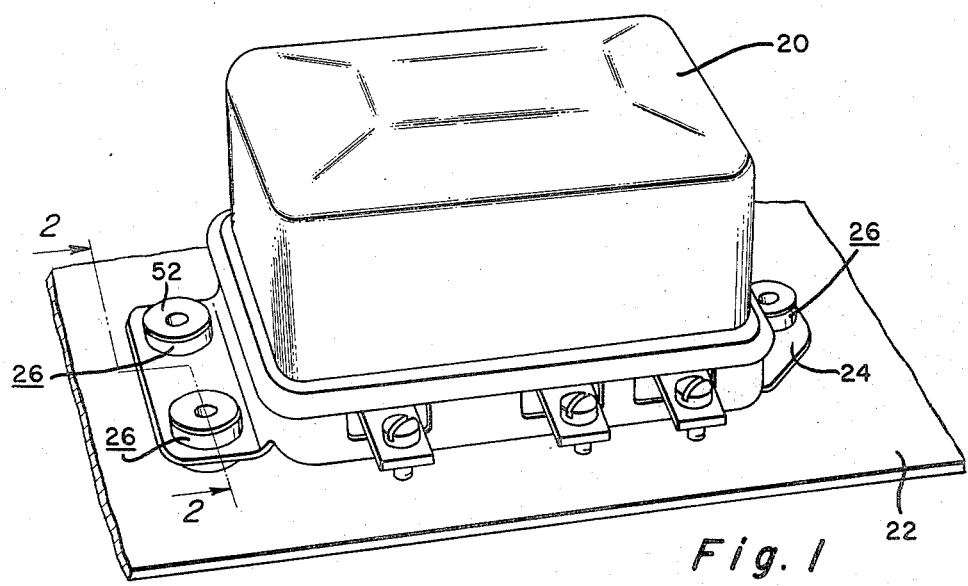

In the drawing, a voltage regulator 20, together with the support plate 22 whereon the voltage regulator is mounted, is shown. The voltage regulator 20 may be of any of the well-known conventional types and has the mounting base or plate 24 which carries the control relays, not shown, of the voltage regulator. The support plate 22 may be either horizontally or vertically disposed in the vehicle and in the embodiment shown is comprehended to be secured to a portion of the fire wall of the vehicle which vertically extends between the passenger and engine compartments. When this arrangement is employed, the regulator 20, shown in Figure 1, will be vertically mounted by means of the three grommets 26 which will provide a three-point suspension for the base 24 of the voltage regulator 20 on the support plate 22.

Figure 2:
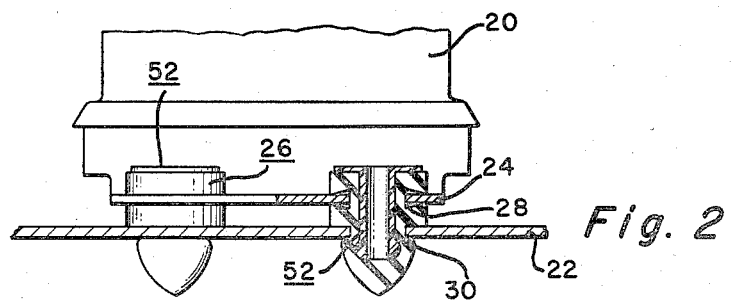
Figure 2 is taken along line 2—2 of Figure 1.

The mounting arrangement according to the present invention is most clearly shown in Figure 2 of the drawings, wherein the base plate 24 is provided with spaced openings or apertures 28 and the support plate 22 is provided with openings or apertures 30 which are alignable with the openings 28 in the base plate 24.

Figure 3:
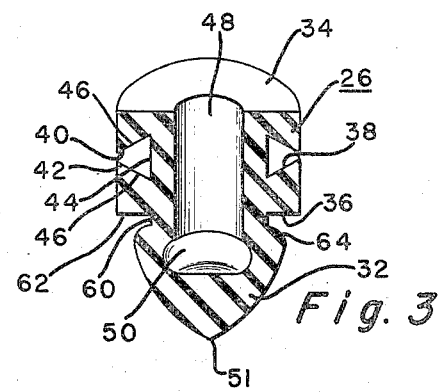
Figure 3 is a cross sectional view of a grommet according to the present invention.

The grommet 26 connecting the base plate 24 to the support plate 22 is most clearly shown in Figure 3. This grommet 26 is formed of a suitable elastomeric material which has rubber-like characteristics and which may be formed of natural or synthetic rubbers or suitable resilient plastic materials all of which are well-known to those skilled in the art. The grommet is formed to have a projectile-like shape which has a rounded nose portion 32 on one end and the substantially flat surface 34 on the other end. Circumscribing the grommet body adjacent the rounded end 32 is a groove 36. Also circumscribing the body of the grommet adjacent the flat surface 34 and spaced from the groove 36 is a groove 38. The groove has a cross section defined by upper and lower walls 46 which are outwardly converging and joined by a root portion 44. As clearly seen in Figure 3 the groove 38 is provided with a pair of lips 42 and 40 which are spaced from each other to engage the opposite surfaces of the part 24 which surrounds the opening 28 when the part 24 is positioned in groove 38. The groove 38 has a greater width at its root portion 44 than the spacing between the lips 40 and 42. The angular side walls 46 extend between the lips 42 and 40 and the root portion 44. In its normal position base 24 is supported in the groove 38 by the lips 40 and 42. Any relative movement between base 24 and plate 22 parallel to the axis of the grommet 26 sets up stress in the grommet material near the walls 46. Both the stress and the resulting deformation are proportional to the distance moved from the normal. Minute vibrations of support plate 22 will be insulated from the base 24 of the regulator by the tips of the lips 40 and 42. A greater relative movement of the parts will stress more of the elastomeric material of the grommet and bring more of it into contact with the base 24.

As clearly seen in Figure 3 of the drawings, the grommet body 26 is provided with a bore 48. This bore 48 extends from the flat surface 34 toward the rounded end 32 and terminates within the rounded end 32. The bore 48 has an enlarged or bulbous portion 50 within the rounded end that is located between the groove 36 and the terminal end 51 of the body. The purpose of the enlarged portion 50 will become hereinafter apparent.

Figure 4:
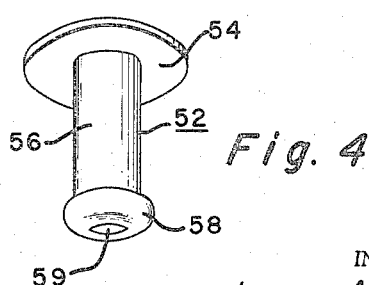
Figure 4 is a perspective view of a member which is insertable in the grommet in Figure 3.

In Figure 4 of the drawings a reinforcing member 52 for the grommet 26 is shown. This reinforcing member 52 has a substantially flat disc-shaped base 54, a round stem portion 56 which is sized to be received in bore 48 and an enlargement or bulbous end 58 on the end of the stem portion. The enlarged portion 58 is sized to be slightly larger than the enlargement 50. The member 52 also is provided with a bore 59 which extends throughout its length from the enlargement end 58 to the flat surface 34. The purpose of this bore will also become hereinafter apparent.

When the grommet 26 is to be installed between the base 24 and the support 22, the flat end surface 34 of the grommet is inserted through the opening 28 in the base 24. This may be accomplished by bending back the material which forms the lips 40. After the grommet is positioned in the opening, and in this connection it is to be noted that the diameter of the root portion 44 is preferably slightly smaller than the diameter of opening 28, the rounded end portion 32 is forced through the opening 30. In this connection, it is to be noted that the diameter of the root portion 60 of groove 36 is preferably slightly smaller than the diameter of the aperture 30. When the parts are in this position, as shown in Fig. 2, the flat surface 62 of groove 36 will be in engagement with the upper surface of plate 22. The reinforcing member 52 is now forced into the bore 48 until the enlarged portion 58 is received in the enlargement 50. In this connection it is to be noted that the bore 59 will permit the entrapped air to escape from the bore 48 when the reinforcing member 52 is inserted into the bore 48. When the reinforcing member is positioned within the bore, the enlarged portion 58 will stress the elastomeric material of the rounded end 32 and force the material which forms the wall 64 of the groove into tight engagement with the lower surface of the plate 22, and the upper surface of plate 22 into tight engagement with the surface 62 to tightly maintain the plate 22 and grommet 26 assembled. It is to be further noted that when the reinforcing member 52 is positioned in bore 48, the flat surface 54 will be pressed tightly against the flat surface 34 of the grommet body. The pressure engagement between surfaces 34 and 54 is maintained by the enlargement 58 which is received in the enlarged portion 50. The pressure exerted by the flat surface 54 on the flat surface 34 will reinforce the body of the grommet between the lip 40 and the flat surface 34, while the lip 42 is in engagement with the lower surface of the plate 24. In this connection it is to be noted that the flat surface 54 will provide a substantially equal reinforcement for the upper lip 40 as is provided by the upper surface of the plate 22 which engages the surface 62. This will provide an arrangement whereby the resistance to vibration or shock in either direction will be substantially equal. Further, it is apparent that rounded end 32 will not only facilitate the assembly of the grommet into the fire wall, but it will also provide a neat appearance on the opposite wall thereof and eliminate the sharp projections which are present when screws and other fastening means are used.

While the embodiments of the present invention as herein disclosed, constitute a preferred form, it is to be understood that other forms might be adopted.

What is claimed is as follows:

1. A shock absorbing and vibration dampening mounting for resiliently attaching a base plate having an aperture therein to a support plate having an aperture therein alignable with the aperture in the base plate, comprising: a body of elastomeric material having a projectile-like shape with at least one groove therein received in the aperture in one of the plates, said groove circumscribing the body adjacent one end thereof and having outwardly converging side walls arranged so the root of the groove is of greater width than the remainder of the groove and greater than the thickness of the plate which is assembled in the groove to permit relative movement in the groove between the plate and body, lip portions formed by the outwardly converging walls of the groove along the external surface of the body and spaced from each other to tightly engage the opposite sides of the plate for resiliently holding said plate in a neutral position in the groove and providing a resistance to movement in the groove proportional to the movement therein from the neutral position, and a means for supporting the material of the body adjacent the groove for increasing the resistance of the lips to said movement.

2. A shock absorbing and vibration dampening mounting for resiliently attaching a base plate having an aperture therein aligned with an aperture in a support plate, comprising, a body of resilient elastomeric material having a bore and a projectile-like shape with a rounded portion on one end and a substantially flat portion on the other end, a circumscribing groove adjacent the rounded end snugly received in the aperture in the support plate when the rounded portion is forced through the aperture, a second groove having a cross-section defined by walls that are outwardly converging and joined by a root section circumscribing the body adjacent the flat end thereof received in the aperture in the base plate, and means in said bore for urging only the circumferentially extending lips of said second groove into contact with said base plate whereby the base plate is maintained in a normal position and a resistance to movement between plates is provided which is proportional to the distance moved whenever the base plate is moved from the normal position.

3. A shock absorbing and vibration dampening mounting for resiliently attaching a base plate having an aperture therein to a support plate having an aperture alignable with the aperture in the base plate, comprising, a body of elastomeric material having a projectile-like shape with at least one groove therein received in an aperture in one of the plates, said groove circumscribing the body adjacent one end thereof and having outwardly converging walls to provide extending lip portions along the external surface of the body, said lips being spaced from each other and engaging the opposite surfaces of the plate to maintain the body and plate in a neutral position when the body and plate are assembled, said groove having a root portion joining said walls that is of greater width than said plate, and a second groove on said body having walls engaging said other plate.

References Cited in the file of this patent

UNITED STATES PATENTS

| 2,367,657 | Boersma | Jan. 23, 1945 |
| 2,419,071 | Hall | Apr. 15, 1947 |
| 2,608,229 | Brutus | Aug. 26, 1952 |
| 2,849,201 | Schelgunov | Aug. 26, 1958 |

FOREIGN PATENTS

| 460,072 | Canada | Oct. 4, 1949 |
| 635,589 | Great Britain | Apr. 12, 1950 |